Feb. 2, 1932. R. STRINDBERG 1,843,182
SLUDGE REMOVER FOR SELF CLEANING AIR FILTERS
Filed Nov. 14, 1927 2 Sheets-Sheet 1
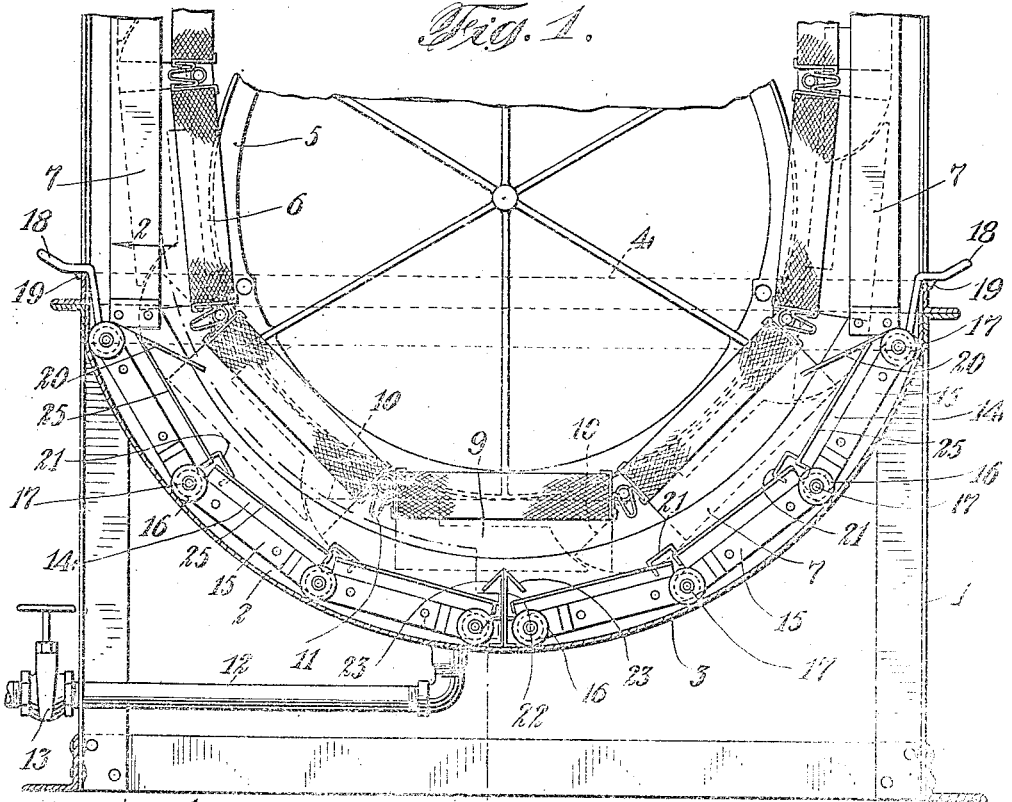
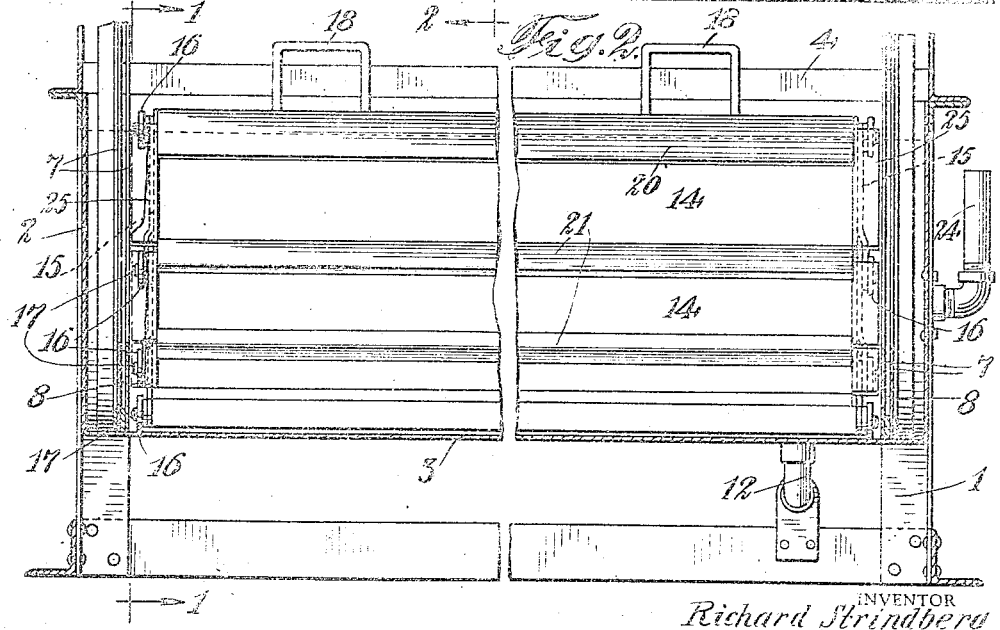

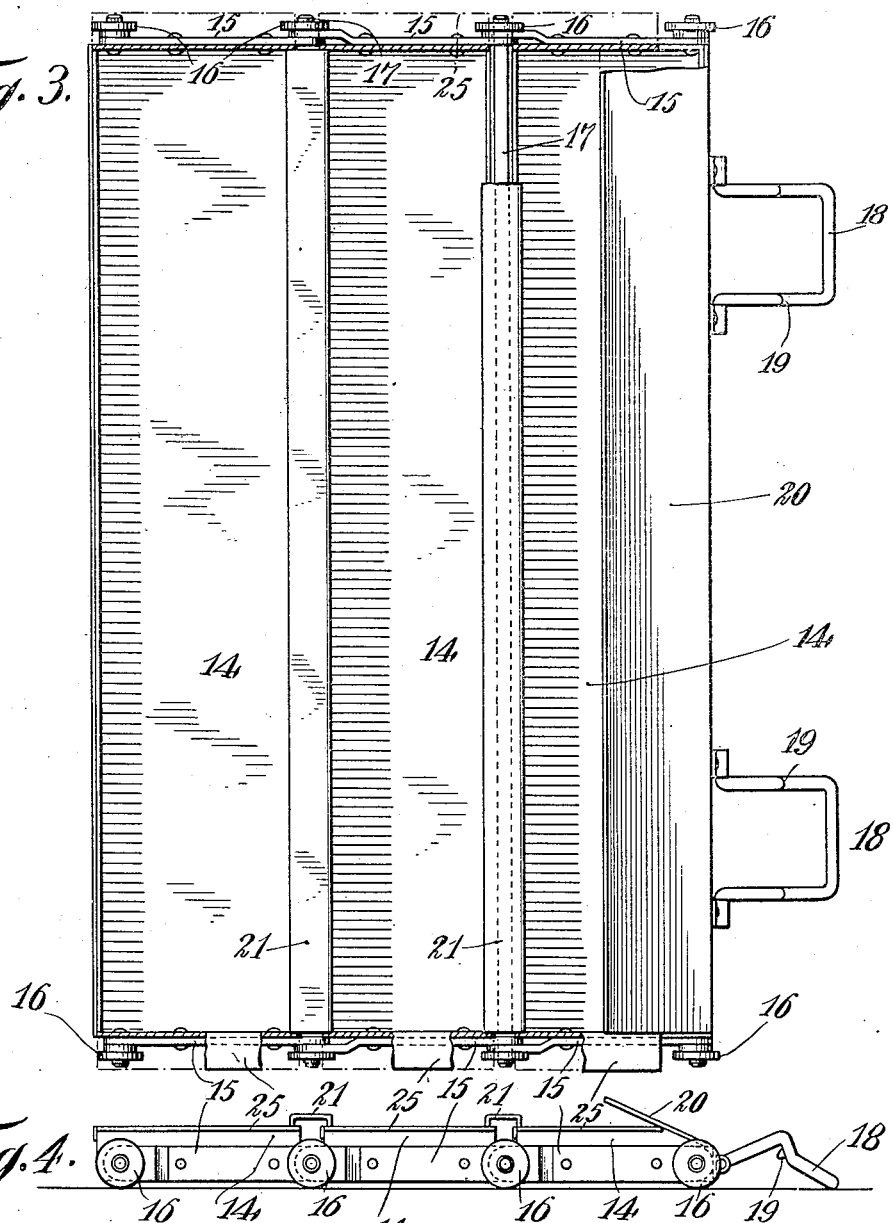

Patented Feb. 2, 1932

1,843,182

UNITED STATES PATENT OFFICE

RICHARD STRINDBERG, OF BRADFORD, PENNSYLVANIA, ASSIGNOR, BY MESNE ASSIGNMENTS, TO AMERICAN AIR FILTER COMPANY, INC., OF LOUISVILLE, KENTUCKY, A CORPORATION OF DELAWARE

SLUDGE REMOVER FOR SELF-CLEANING AIR FILTERS

Application filed November 14, 1927. Serial No. 233,033.

This invention relates to improvements in filters, particularly air filters; and has for its object to provide an efficient apparatus for removing dirt from the oil or other medium by which the filter is cleaned.

My invention is especially adapted for air filters of the chain operated type wherein a plurality of units are mounted upon an endless chain, so that the units by which the filtering is effected can be kept in motion, either continuously or periodically, while the air passes through them. At one point in their movement the units can be cleaned in succession and thus the entire structure can be kept in operation over a prolonged period without becoming foul and rendered unserviceable.

The aim of this invention is to provide an apparatus designed to facilitate the thorough and convenient removal of all dirt which settles at the bottom of a chain filter where the filter cells or units are cleaned at certain intervals, as by letting them pass through a tank filled with oil at the bottom of the filter. The dirt thus taken out of the filter cells or units ordinarily mixes with the oil and sinks as a thick viscous sediment to the bottom of the tank; from which it can be extracted only by draining off the oil and then scraping it out. Thus far no means for straining the oil has been found to remove fine dirt particles effectively without being clogged up in a short time, particularly when large quantities of dirt must be extracted.

The best method of getting dirt out of oil that is thus used in cleaning an air filter is by settling; and in the practice of this invention, the dirt which settles from the oil in the tank through which the filter cells are passed to be cleaned, can very easily be collected by means of receptacles in the tank, which can be taken out without draining the tank of the oil, and emptied. Thus the filter is cleaned as required and the oil is prevented from becoming overcharged with dirt, sludge and the like without the need for drawing the oil out of the tank to clear the latter of the sediment which would otherwise collect therein.

The nature of the invention is illustrated on the accompanying drawings, and the novel features defined in the appended claims; but I, of course, do not wish to be restricted to the exact details herein disclosed as I may vary or change the devices used without departing from the spirit of my invention.

In the drawings,—

Figure 1 is a sectional side view of a cleaning tank containing the receptacles used in the practice of my invention, part of the chain filter also being included;

Figure 2 is a section on line 2—2 of Figure 1, certain parts being omitted;

Figure 3 is a top plan view of a group of receptacles to be disposed in the tank and catch the dirt settling therein;

Figure 4 is a side view of the said receptacles, and

Figure 5 is an end view of the same, seen from the right of Figure 4.

On the drawings, the same numerals identify like parts throughout.

The numeral 1 indicates the lower part of the supporting frame for the filter with the tank for holding the oil shown at 2 at the bottom of this frame. This tank may be in the form of a trough, the top of which is open, but having a closed bottom 3 which is curved from one end of the tank to the other, the edges of the top shown at 4 being straight. At the lower end of the frame is shown a chain guide 5; which may extend into the tank and be concentric with the curved bottom 3, and there will, of course, be a driving sprocket wheel at the top, for the connected air filter units or cells 6. These units need not be described herein except to say that they comprise mesh-work containing a filtering medium through which the air passes while the units are in motion or stationary; and as dust collects in these units the units are cleaned by the oil with which the tank 2 is filled, as the units pass through this tank.

The general construction of this type of filter is fully set forth in the application of Anders Jordahl Serial No. 107,118, filter apparatus, filed May 6, 1926; and the connected air cells may be moved continuously, step by step, or otherwise when the filter is in operation. Air passes through the cells from side to side, say from right to left or vice versa, with reference to Figure 1; and the front and back of the support will be closed, so that no air can enter and leave the filter without passing through the cells above the tank 2.

The frame work is provided at each of its sides with a pair of flanges 7, close together to make a narrow channel 8, and similar flanges or ribs are located in the tank which rest upon the bottom. Thus the channels or chutes 8 at each side of the frame 1 continue through the tank 2, along the bottom 3. Each unit 6 has a longitudinal flange 9 projecting from each side and extending in between the guides or ribs 7 so as to run as snugly as possible in the chutes or channels 8 formed by these guides at the sides of the frame 1 and in the tank 2. The flanges 9 on each one of the cell frames may each have an extension 10 at one end, to overlap the adjacent end of the flange of the neighboring cell, so that there will be no space between the flanges of successive units when they pass around the guide member 5 and the units are no longer in line with one another. These units are united by links attached to their sides and pinned together at the ends and between each pair of adjacent cells is a flexible connecting member 11, as long as the width of the cell, to fill the space between each two adjacent cells. The tank has a drain pipe 12 in which there is a controlling valve 13.

The construction thus far described is fully disclosed in the above mentioned application of Jordahl and, except for the shape of the tank 2, forms no part of my invention.

With the tank 2 filled with oil, the cells 6 passing through the oil cause the filter units to be cleaned and the oil becomes charged with dirt which settles to the bottom. As above stated, to catch this dirt and prevent it from forming a thick sediment in the bottom of the tank, I use receptacles 14 in the form of trays which are placed within the tank and rest upon the bottom 3, extending from one end to the other. Each receptacle has a link or bar 15 fastened to each side on the exterior thereof and perforated to permit the mounting of rollers 16. With the trays 14 in the tank 2, the lowermost trays in the middle of the tank will have their two front rollers set back a little so that they do not project to any material extent beyond the front edges of these trays; and so with the rollers at the rear ends of the highest trays in the tank; and the links 15 terminate flush with these ends of these trays. At the rear ends of the lowermost trays and the front ends of the uppermost trays, the links 15 will project, and the links of the intermediate tray or trays will project at both ends, and be perforated to receive between the adjacent trays, shafts 17 on which the intermediate rollers are mounted. The uppermost receptacles will be provided with pivoted handles 18 which have projections 19. These particular receptacles will each have an overhanging rear edge, flange or screen 20, extending down close to the level of the oil in the tank to prevent anything being dropped into the oil at the ends of the tank 2; and from the front, or when the trays are in the tank, the lower edge of each receptacle projects a plate 21 extending over the nearest edge of the adjacent receptacle and down into same. Only the lowermost receptacles lack this plate, for a reason stated below. These cover plates 21 appear hook shaped when viewed from their ends. I have shown the tank as provided with six such receptacles in two groups of three each, but obviously a greater or less number may be used. The handles 18 engage the edges of the ends of tank 2 and the projections 19 act as stops to allow the receptacles to go down into the tank no farther than necessary. At the middle of the tank is a cross rib 22 between the chutes 8 having flanges 23 which overhang the forward ends of adjacent receptacles and close the space between the same and this cross rib 22. At 24 is an overflow pipe for the tank 2.

The side of each tray also has an outwardly extending longitudinal flange or projection 25 overlying the rollers 16 and acting as a cover for the space between the tray and the adjacent chute 8. These flanges will be so shaped and mounted on the trays that when the trays are in the tank, the ends of these flanges will preferably leave no space or crevice between them.

In operation, as the chain carries the filter units through the tank the dirt is taken out of the units by the oil and the dirt settles into the receptacles 14. The spaces between the adjacent ends of these receptacles being covered by the plates 21 and between the sides of trays and the chutes 8 by the flanges 25, and between the rib 22 and the adjacent trays by the flanges 24 of the rib 22, with the cells 6 running so that their flanges 9 at both sides are always within the two chutes 8 provided by the flanges 7; any dirt which is removed from the units 6 will be directly in line with the receptacles 14 as it sinks by gravity; and thus all the dirt will settle into the receptacles 14 and very little will reach the bottom of the tank 2. Whenever it is necessary to move the dirt the operator takes hold of the handles and pulls out each group of receptacles 14 to be emptied and cleaned, then these receptacles can be replaced. All the dirt thus settles out of the oil which never has to be drawn off to be filtered or screened and the tank 2 never has to be scraped because no sediment collects in it.

The flanges 25 may be either extended edges of the sides of the trays, or separate members secured in place and so with the parts 20 and 21.

For the sake of clearness the flanges 25 are shown in part only on Figures 2 and 3; and in Figure 2, the cells 6 are omitted.

I claim:

1. Cleaning apparatus for a moving filter comprising a tank for a cleaning liquid, removable receptacles in said tank to catch substances removed from said filter, the receptacles carrying means to cover spaces between said receptacles and said tank.

2. Cleaning apparatus for a moving filter comprising a tank for a cleaning liquid, and a plurality of receptacles in said tank for receiving substances extracted from said filter and settling therein, said tank and said receptacles having means each covering the spaces between certain of the adjacent receptacles.

3. Cleaning apparatus for a filter, including a plurality of aligned receptacles, certain of said receptacles each having a portion extended to cover the spaces between the receptacles, and a tank to receive said receptacles in a position to cooperate with the filter.

4. Cleaning apparatus for a filter comprising a plurality of receptacles, one of which has an overhanging edge forming a flange to screen same, and handles carrying stops attached thereto.

5. Cleaning apparatus for a filter comprising a tank, a plurality of groups of receptacles in said tank, means for enabling each group to be temporarily connected to the end of the tank, and a transverse rib in said tank having flanges for covering the space between the adjacent receptacles of said groups.

6. Cleaning apparatus for a chain filter comprising a tank for a cleaning liquid, a support for said filter and tank, flanges at the sides of the support and the tank to form chutes, said filter comprising connected units, and flanges extending from the sides of each unit to enter said chutes.

7. Cleaning apparatus for a chain filter comprising a tank for a cleaning liquid, a support for said filter and tank, flanges at the sides of the support and the tank to form chutes, said filter comprising connected units, and flanges extending from the sides of each unit to project within said chutes at the sides of same, said flanges having extensions at the ends to bridge the spaces between them when said units pass into said tank.

8. Apparatus for cleaning a filter of the chain type comprising a plurality of filter units connected together, a framework for said filter, a tank at the lower part of said framework to receive a cleaning liquid, said framework and said tank having chutes, the filter units having flanges extending within said chutes, and a plurality of connected receptacles between the chutes of the tank to catch substances removed from said filter units and settling in said tank, the spaces between said receptacles being covered.

9. A tank for a chain filter, said tank having flanges extending longitudinally of its bottom to provide chutes within said tank, the filter comprising units having flanges which move through said chutes.

10. Cleaning apparatus for a chain filter comprising a tank having a transverse rib therein, the rib having its ends spaced from the sides of the tank, the top of said rib having laterally extending flanges, and one or more receptacles to be received in said tank to project beneath the top of said rib.

11. Cleaning apparatus comprising a tank having parallel flanges extending along the bottom to form a pair of chutes, and a transverse rib in the tank between said chutes, the top of the rib having oppositely extending lateral flanges, and one or more receptacles to be received in said tank to project beneath the top of said rib.

12. Cleaning apparatus for a filter comprising a plurality of receptacles, one of said receptacles having its edge extended into the adjacent receptacle to cover the space between the two, and a tank to receive said receptacles.

13. Cleaning apparatus for a filter comprising a receptacle having handles along one edge with projections on said handles, and a tank to receive said receptacle on its bottom and to engage the projections on said handles.

14. Cleaning apparatus for a moving filter comprising a tank for a cleaning liquid and a plurality of receptacles in said tank to receive substances extracted from said filter and settling therein, said tank and said receptacles having means for covering the spaces between the receptacles and at the ends and sides thereof.

15. Cleaning apparatus for a filter having filtering means, including a tank for a cleaning liquid, sludge receiving receptacles in said tank below the filtering means, and means fixed to the tank wall between the adjacent receptacles and directing the precipitated sludge into said receptacles.

16. In an air filter of the type in which a filtering unit is movable through a cleaning liquid contained in a tank, flexible sludge removing means, and means supporting said sludge removing means between the filter and the bottom wall of the tank and permitting of the removal of said sludge removing means from the tank without interruption in the operation of the filter.

17. In a self cleaning filter of the type in which filter units move through a cleaning liquid contained in a tank, an articulated series of sludge receiving receptacles removably supported between the filter and the bottom wall of the tank.

18. In a self cleaning filter of the type in which filter units move through cleaning liquid contained in a tank, flexible sludge collecting means movably supported on the bottom wall of the tank beneath the filter and means connected to said collecting means for withdrawing the same from the tank for the removal of the collected sludge without interruption in the operation of the filter.

19. Sludge removing means for self cleaning filters of the type in which articulated filter units move through the cleaning liquid contained in a tank, said means consisting of an articulated series of sludge collecting receptacles insertable into or removable from the tank below the filter units without interruption in the operation of the filter.

20. Cleaning apparatus for a filter having a filtering medium, said apparatus including a tank to receive the cleaning liquid for the filtering medium, a plurality of connected sludge collecting receptacles removably supported in said tank, and means carried by the receptacles including parts cooperating with the side walls of the tank preventing precipitation of the sludge exteriorly of said receptacles.

In testimony that I claim the foregoing as my invention, I have signed my name hereto.

RICHARD STRINDBERG.